(12) United States Patent
Eulitz et al.

(10) Patent No.: US 8,590,132 B2
(45) Date of Patent: Nov. 26, 2013

(54) METHOD FOR PRODUCING A FUEL CONTAINER FOR MOTOR VEHICLES AND FUEL CONTAINER FOR MOTOR VEHICLES

(71) Applicant: Kautex Textron GmbH & Co. KG, Bonn (DE)

(72) Inventors: Dirk Eulitz, Bonn (DE); Harald Lorenz, Bad Neuenahr-Ahrweiler (DE); Gerd Wolter, Konigswinter (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 13/632,727

(22) Filed: Oct. 1, 2012

(65) Prior Publication Data

US 2013/0092317 A1    Apr. 18, 2013

Related U.S. Application Data

(62) Division of application No. 12/482,660, filed on Jun. 11, 2009, now Pat. No. 8,276,778.

(30) Foreign Application Priority Data

Jun. 11, 2008 (DE) .......................... 10 2008 027 823

(51) Int. Cl.
    *B23P 11/00* (2006.01)
(52) U.S. Cl.
    USPC .............................. 29/432; 29/527.1; 264/545
(58) Field of Classification Search
    USPC ................. 29/432, 527.1; 220/562, 660, 746; 264/171.12, 531, 534, 540, 545, 250
    See application file for complete search history.

(56) References Cited

U.S. PATENT DOCUMENTS

| 4,719,072 A | * | 1/1988 | Kojima et al. | 264/515 |
| 4,952,347 A | * | 8/1990 | Kasugai | 264/457 |
| 5,052,437 A |   | 10/1991 | Danna | |

(Continued)

FOREIGN PATENT DOCUMENTS

| DE | 10317407 | 12/2004 |
| DE | 102004061317 | 8/2005 |

(Continued)

OTHER PUBLICATIONS

International Search Report dated Aug. 12, 2010, received in corresponding PCT Application No. PCT/EP09/02508.

(Continued)

*Primary Examiner* — David Bryant
*Assistant Examiner* — Ruth G Hidalgo-Hernandez
(74) *Attorney, Agent, or Firm* — Grossman Tucker Perreault & Pfleger, PLLC

(57) ABSTRACT

A method for producing a fuel container and a fuel container for motor vehicles. The method comprises the extrusion of web-type preforms, the shaping of the preforms to form shell-shaped intermediate products in a first step, and forming a container in the same molding tool in a second step, at least one tank-filling and/or operational venting device being fastened to the inner wall of at least one intermediate product between the first and second steps by a material and/or form-fitting joint in one work cycle, the wall of the intermediate product being penetrated by a connection fitting during assembly, with a use of at least one conduit section of variable length as a part of a vent line.

2 Claims, 6 Drawing Sheets

(56) References Cited

U.S. PATENT DOCUMENTS

| | | | |
|---|---|---|---|
| 5,514,323 A * | 5/1996 | Ramioulle | 264/516 |
| 5,534,218 A * | 7/1996 | Daubenbuchel et al. | 264/516 |
| 5,891,385 A * | 4/1999 | Cerbelle et al. | 264/515 |
| 6,071,370 A * | 6/2000 | Stiles | 156/285 |
| 6,712,234 B2 * | 3/2004 | Boecker | 220/563 |
| 6,860,398 B2 | 3/2005 | Potter et al. | |
| 6,893,603 B2 | 5/2005 | Rohde et al. | |
| 6,932,103 B2 | 8/2005 | Iwamoto | |
| 7,047,949 B2 | 5/2006 | Reiter et al. | |
| 7,059,305 B2 | 6/2006 | Knaggs et al. | |
| 7,143,750 B2 | 12/2006 | Brunel et al. | |
| 7,290,675 B2 * | 11/2007 | Gombert et al. | 220/562 |
| 2002/0063129 A1 * | 5/2002 | Potter et al. | 220/4.13 |
| 2002/0105115 A1 * | 8/2002 | Sadr | 264/510 |
| 2006/0141184 A1 * | 6/2006 | Rohde et al. | 428/35.7 |
| 2008/0078761 A1 | 4/2008 | Borchert et al. | |

FOREIGN PATENT DOCUMENTS

| | | |
|---|---|---|
| DE | 102005014888 | 10/2006 |
| GB | 2281726 | 3/1995 |
| JP | 2001205663 | 7/2001 |
| JP | 2008513255 | 5/2008 |
| WO | 2006095024 | 9/2006 |
| WO | 2007000454 | 1/2007 |
| WO | 2008061588 | 5/2008 |

OTHER PUBLICATIONS

PCT Translation of the International Preliminary Report on Patentability/Written Opinion mailed Jan. 20, 2011, received in corresponding PCT Application No. PCT/EP09/02508, 17 pgs.

English translation of Korean Office Action issued Aug. 8, 2012 in corresponding Korean Application No. 2010-7027623, 4 pgs.

* cited by examiner

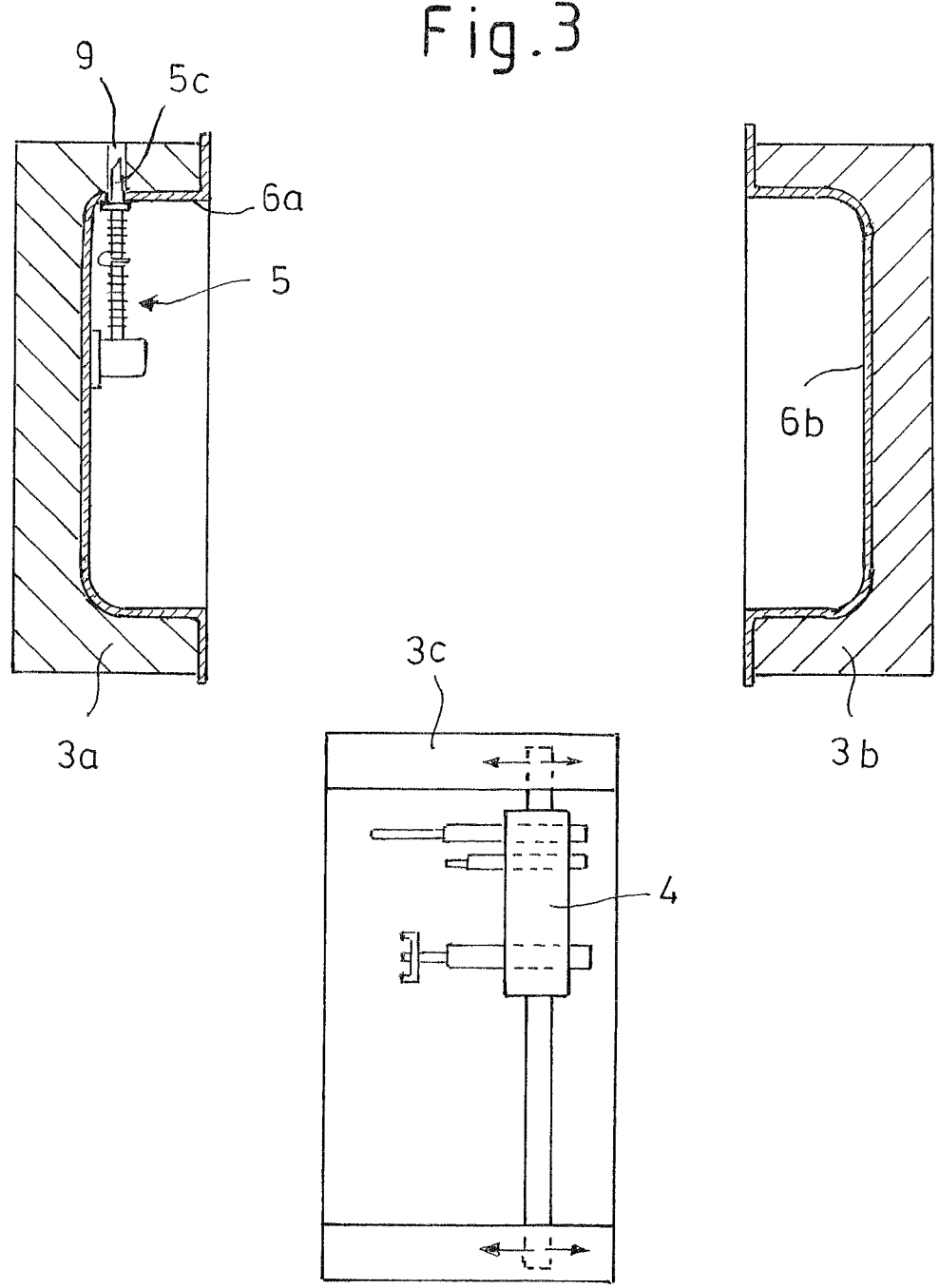

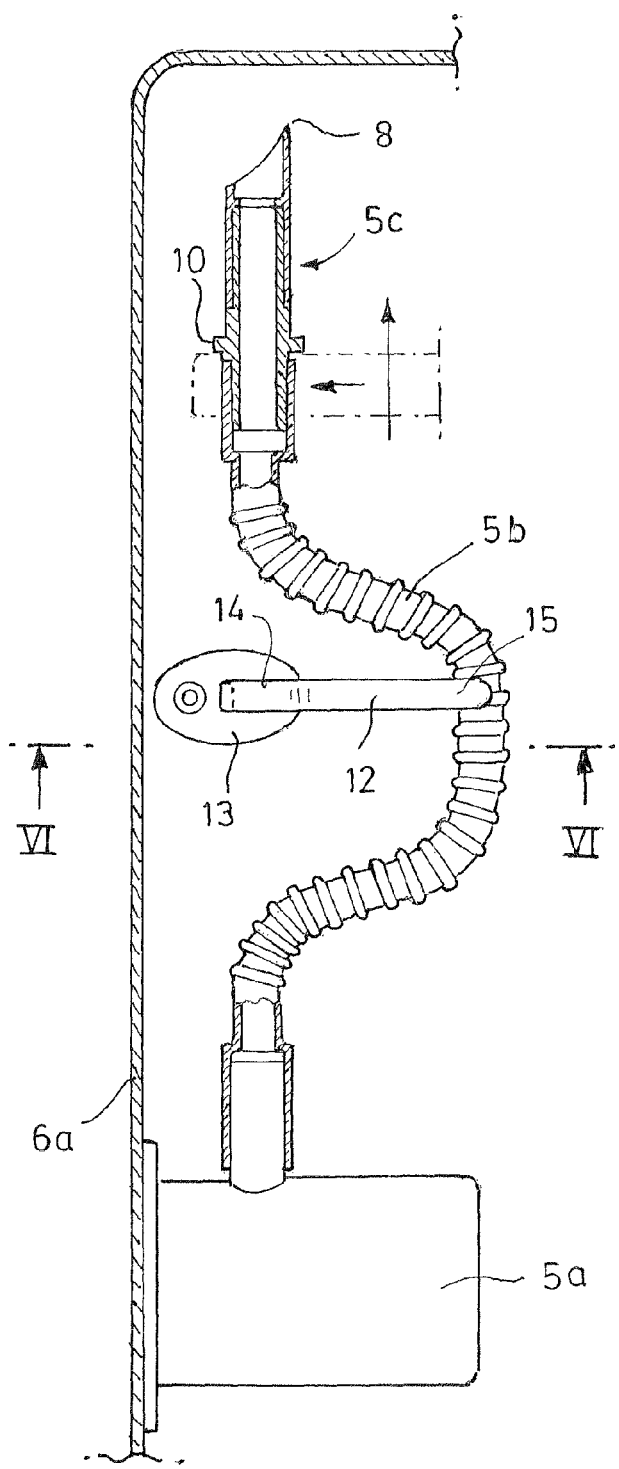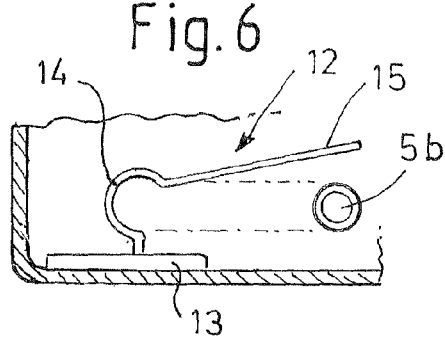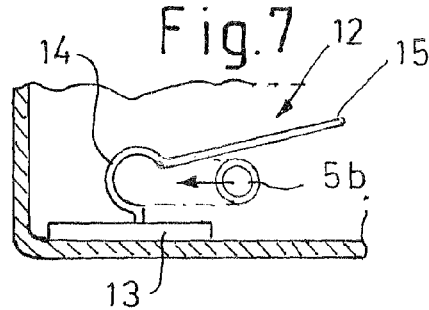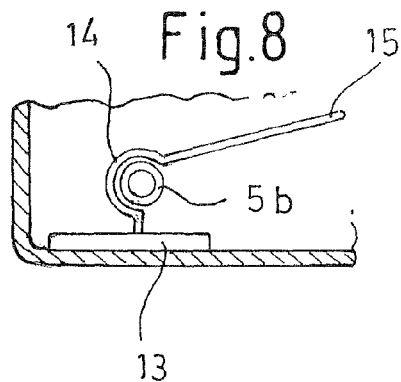

METHOD FOR PRODUCING A FUEL CONTAINER FOR MOTOR VEHICLES AND FUEL CONTAINER FOR MOTOR VEHICLES

This application is a divisional application of U.S. Ser. No. 12/482,660, filed Jun. 11, 2009, and claims priority to German Patent Application No. 10 2008 027 823.8 filed Jun. 11, 2008.

The invention relates to a method for producing a fuel container for motor vehicles from thermoplastic material, and to a fuel container for motor vehicles of thermoplastic material, with at least one tank-filling and operational venting device which is arranged in the interior of the fuel container, at least one vent line extending between a fixed connection point on the inner wall of the container and an opening through the container wall.

Motor vehicle fuel containers of thermoplastic material are produced in one piece by extrusion blow moulding, or by welding together half-shells injection-moulded from thermoplastic material. It is also known to produce the half-shells by deep drawing or thermoforming of sheet-type plastics semi-finished products. Fuel containers for motor vehicles usually include built-in parts such as fuel pumps, fuel level sensors, vent valves, condensation containers and fuel vapour filters. The known fuel containers consist of polyolefines, which are known not to be impermeable to hydrocarbons. For this reason plastics fuel containers are produced from multi-layer extrudates with barrier layers for hydrocarbons. These barrier layers, for example of EVOH, are impermeable to liquid and gaseous hydrocarbons. In order to avoid potential emission paths for hydrocarbons, all components necessary for operation of a fuel container are usually arranged in the interior thereof, in which case the number of interfaces to the motor vehicle must be kept as small as possible.

In the production of one-piece extrusion blow moulded fuel containers it is known, for example, to introduce built-in components, by means of carriers provided for this purpose, into the downwardly open extruded preform tube. The tools are then closed around the preform tube provided with the built-in parts, the preform being shaped in known fashion inside the closed moulding tool.

In an alternative method for producing plastics fuel containers for motor vehicles, web-type extrudates are produced which in a first step are shaped in a multi-part moulding tool to form a shell-shaped intermediate product, and in a second step are shaped in the same moulding tool to form a one-piece, closed container. In this case an intermediate frame is arranged between two moulding tools defining the mould nest, inside which mould nest component carriers are arranged displaceably, or deployably and retractably, optionally on a further intermediate frame. In an intermediate step functional components are introduced by means of the component carriers into the still warm-plastic intermediate product already formed into a shell and are connected thereto by a form-fitting and/or material joint.

Alternatively, of course, it is possible to place and fasten built-in components in the fuel container through an inspection opening to be provided in the finished container, although such completion of a fuel container must predominantly be carried out manually and is very complex and costly.

In the method described previously, therefore, the introduction of all functional components, including the required venting devices, in one work cycle inside the moulding tool would be desirable in principle.

In particular, the installation of tank-filling and operational venting devices in the container to be produced has hitherto presented difficulties in the shaping of the container, since the position of the vent points in the subsequent container wall can vary because of shrinkage distortion and production tolerances. Thus, the fully automatic production of the conduit openings, and the fastening of the valves to the vent points of the fuel container provided for them, initially presents no difficulty; up to now, however, the connecting lines between the vent points and, for example, an opening through the tank wall have still had to be installed manually.

It is therefore the object of the invention to provide a method for producing a fuel container for motor vehicles from thermoplastic material which is improved in this regard.

It is a further object of the invention to provide a fuel container of the above-described type which makes possible a very highly automated introduction of the built-in components during the production process.

The object is achieved, firstly, by a method for producing a fuel container for motor vehicles from thermoplastic material comprising the production of web-type preforms, the shaping of the preforms in the first heat in a multi-part moulding tool to form shell-shaped intermediate products in a first step, and to form a one-piece, closed container in the same moulding tool in a second step, at least one tank-filling and operational venting device being fastened to at least one inner wall of the intermediate product between the first and second steps in such a manner that at least one preassembled part of the tank-filling and operational venting device with at least one connection fitting, at least one venting device and at least one functional component is connected to the inner wall by a material and/or form-fitting joint in one work cycle, the wall of the intermediate product being penetrated with the connection fitting during assembly, specifically with the use of at least one conduit section of variable length as a part of the vent line.

The invention can be summarised by stating that the use of at least one conduit section of variable length in a tank-filling and venting device creates an additional degree of freedom of assembly which makes possible the fully automated fastening of the venting device in the fuel container. In addition, shrinkage and swelling tolerances are compensated in this manner.

Venting devices usually consist of operational vent valves, tank-filling vent valves and safety valves, for example roll-over valves which block the vent line in the event of overturning. The vent valves, which may combine a plurality of functionalities in one valve housing, are usually to be arranged at different remote vent points in the fuel container, specifically on the upper inner wall in the installed position. Without additional degrees of freedom of assembly, the installation of such spiders or networks of lines is difficult, simply because of the complex contours of modern fuel containers. The inventive solution makes it possible to implement any desired degrees of freedom of assembly for automated fastening with pneumatic manipulation devices.

In a preferred variant of the method according to the invention it is provided that the amount of length-variability of the vent line is selected such that this amount corresponds approximately to the distance travelled by the connection fitting as it penetrates the wall of the intermediate product. It is ensured in this way that the vent line concerned can adapt to the penetration movement. In the event that the line is configured, for example, as a corrugated tube, it is also ensured that the line does not hang down in the direction of gravity in the finished container, which is undesirable in principle. Condensed fuel can collect in conduit loops and may then be entrained during venting of the fuel container. It is important to avoid the formation of such a siphon.

The object underlying the invention is further achieved by a fuel container for motor vehicles of thermoplastic material with at least one tank-filling and operational venting device which is arranged in the interior of the fuel container, at least one vent line extending between a fixed connection point on the inner wall of the container and an opening through the container wall, and the fuel container according to the invention being characterised in that the vent line is configured to be variable in length.

The vent line may have, for example, a corrugated or bellows-type configuration, at least zonally. Alternatively, the vent line may comprise alternating sections of softer and harder material.

In a further alternative configuration of the fuel container according to the invention it is provided that the vent line has a multi-part configuration, sections of the vent line guided one inside the other having a telescopic configuration.

Through the configuration of the vent line according to the invention relatively large length adaptations are advantageously possible, which length adaptations are required in order to ensure appropriate degrees of freedom of assembly, for example when a prefabricated vent line with a vent valve is to be welded to the container wall at one end and must penetrate the container wall by means of the connection fitting at the other end.

Thus, according to the invention a completely preassembled composite line can be arranged in the container. No subsequent manual or automated connection of the components is required within the production process. The prefabricated venting device may be designed such that two or more connected components which must move away from or towards one another in use and/or during production can be arranged on a common axis.

In addition, the telescopic configuration of the vent line has the advantage that siphon-formation is reliably avoided as a result of the construction.

The amount of length-variability of the vent line advantageously corresponds approximately to the degree of freedom of assembly in the longitudinal direction of the vent line during fastening of the tank-filling and operational vent line to the inner wall of the container.

In this case possible shrinkage and swelling tolerances can also be taken into account.

The parts of the vent line guided one inside another are advantageously sealed with respect to one another.

With the use of a corrugated vent line it is useful, for example, to support the vent line between its connection points against gravitational force acting in the installed position.

For this purpose it may be provided that the vent line is suspended from the container wall by means of at least one retaining clip.

The retaining clip may be in the form, for example, of a retaining spring. Siphon-formation in the vent line is thereby avoided.

The retaining clip or retaining spring is advantageously so arranged that in the extended state, that is, after the penetration movement of the connection fitting has been performed, the vent line is at least partially surrounded by the retaining clip. Automated installation of the components to be introduced into the container is thereby ensured.

In the fuel container according to the invention the connection point to the inner wall of the container and the opening through the inner wall of the container are preferably provided on sections of the container wall which extend at an angle to one another.

The invention is explained below with reference to an exemplary embodiment represented in the drawings, in which:

FIG. 3 is a view of the moulding tools corresponding to the view in FIGS. 1 and 2, the central frame having been moved out from between the mould halves so that the mould halves can close for the purpose of joining the intermediate products;

FIG. 4 shows a section through one of the intermediate products on the way to producing the finished fuel container during the installation of the venting device according to a first variant of the fuel container;

FIGS. 6-8 show a section along the lines VI-VI in FIG. 4 during the fixing of the vent line in the retaining clip;

Figure 9:
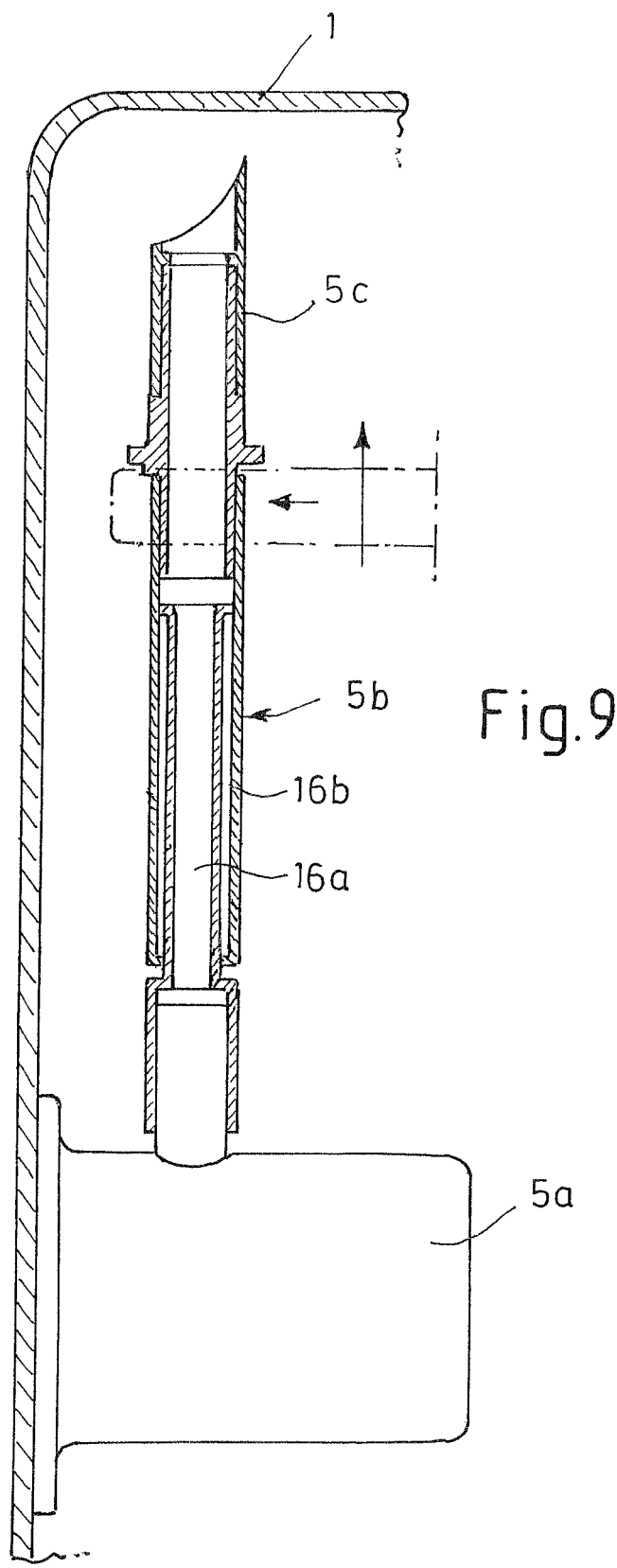
Figure 10:
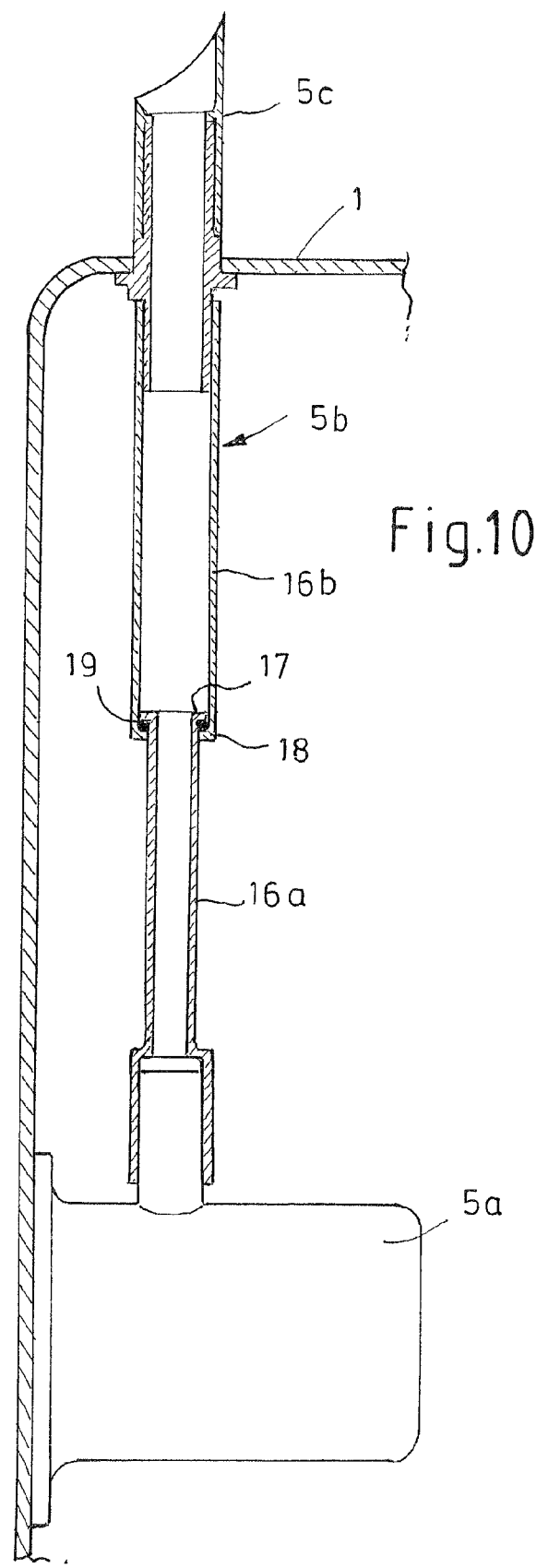

FIG. 9 is a view corresponding to FIG. 4 of a further variant of the fuel container according to the invention, and FIG. 10 shows the venting device represented in FIG. 9 in the final position The method according to the invention will first be explained substantially with reference to FIGS. 1 to 3. This method comprises the extruding of two web- or sheet-type preforms 1 of thermoplastic material from one or more extruders (not shown) arranged above the tool 2. The preforms 1 may have been obtained by cutting open a tube-shaped preform or alternatively may have been extruded from wide-slot nozzles. The preforms 1 consist substantially of a six-layer coextrudate of polyethylene, regrind (scrap), adhesive agent layers and EVOH barrier layers for hydrocarbons. The layer structure of such extrudates is known in principle. The preforms may have been extruded directly above the tools in the direction of gravity; alternatively, they may have been removed from an extrusion head by means of a manipulation device and transferred into the tools 2.

Figure 1:
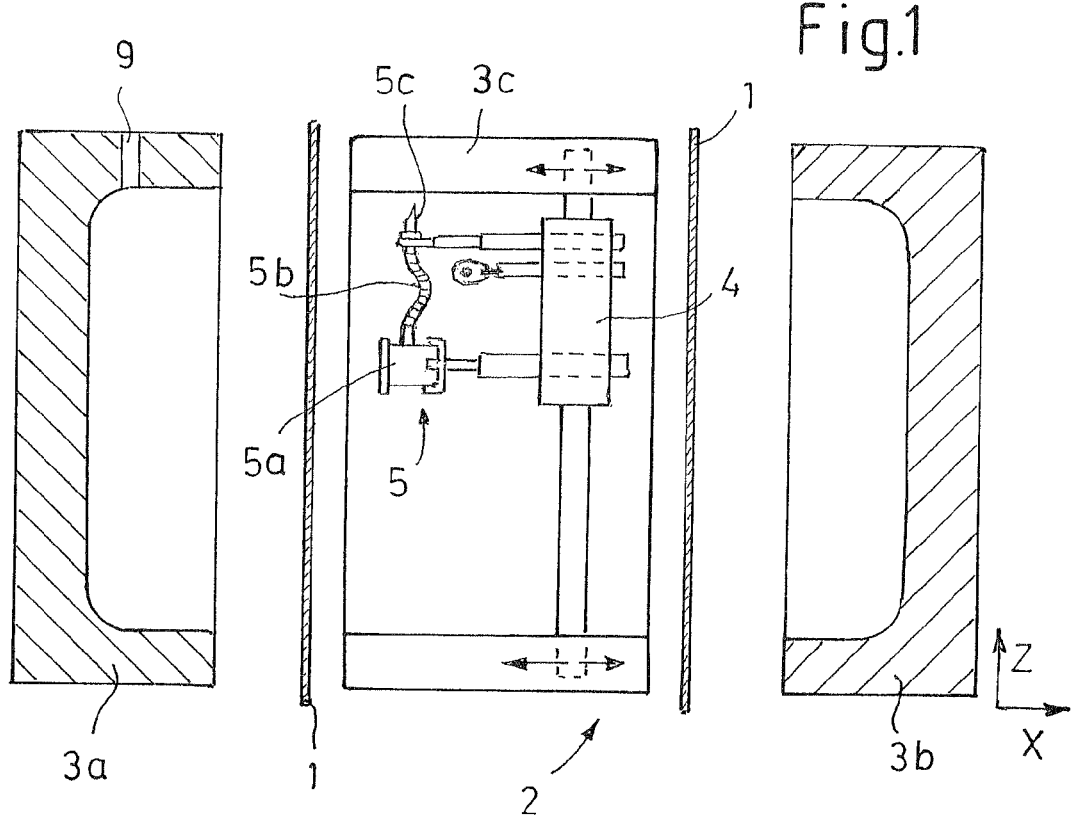
FIG. 1 is a view of the moulding tools for producing the fuel container according to the invention in the open state.
Figure 2:
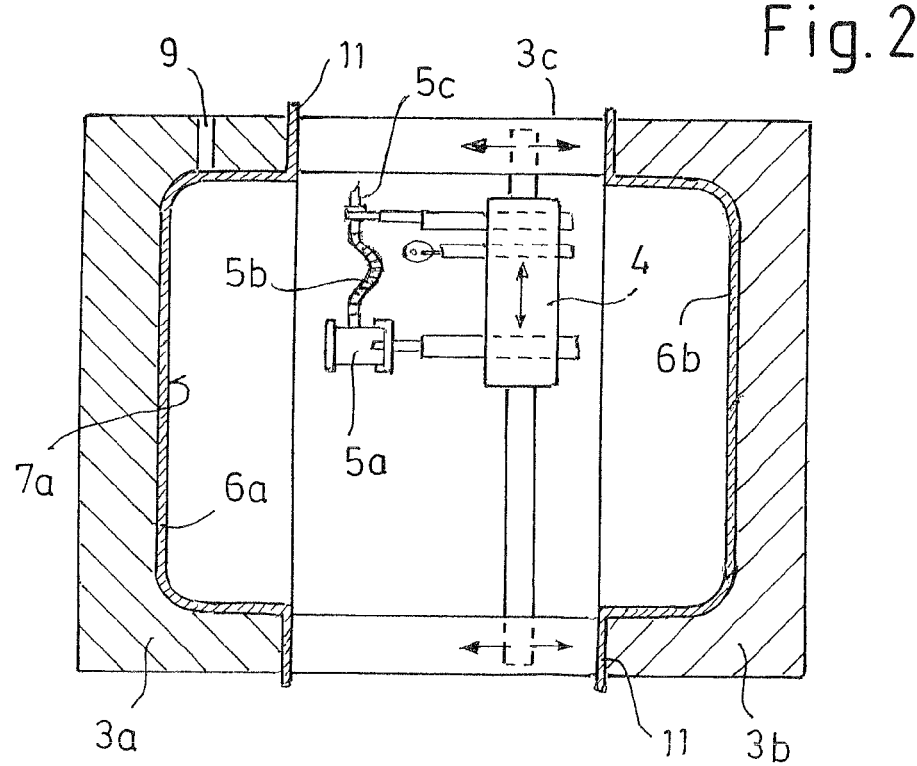
FIG. 2 is a schematic representation of the moulding tools in the closed state during shaping of the intermediate product.
Figure 5:
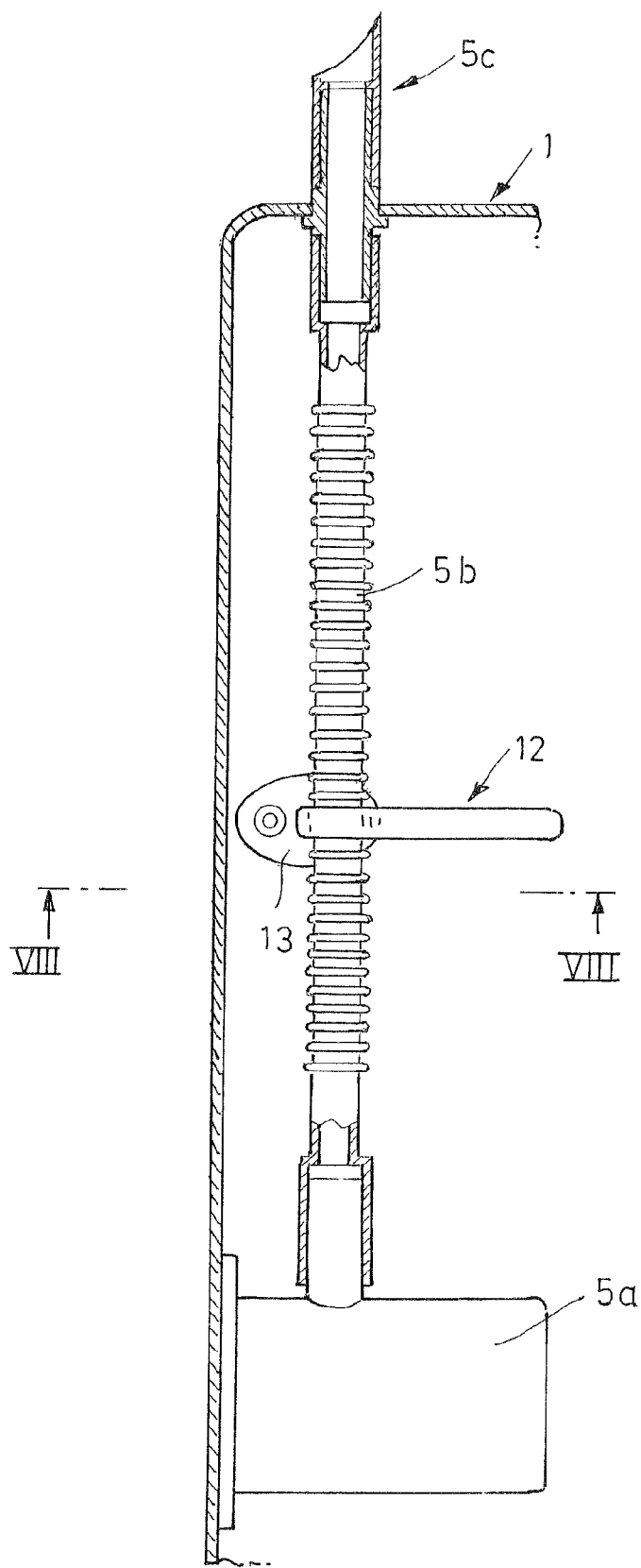
FIG. 5 is a view corresponding to FIG. 4 with the venting device in its final position.

The tools 2 are shown in a partially sectional top view in FIGS. 1 to 3. They comprise two outer moulds 3a, 3b and a central mould 3c in the form of an intermediate frame. The outer moulds 3a, 3b can be moved towards and away from one another in the sense of an opening and closing movement. The central mould 3c is displaceable transversely thereto, as is shown, for example, in FIG. 3.

The axes of movement are marked by way of example in the form of a coordinate system in FIG. 1, the opening and closing movement of the outer moulds taking place in the x-axis and the displacement movement of the central mould 3c taking place in the z-axis.

Arranged inside the central mould 3c is a pneumatically displaceable component carrier 4 which can be displaced in the x- and z-axes by means of pneumatic cylinders (not shown in detail), the component carrier 4 receiving a tank-filling venting device 5 of the subsequent fuel container in the drawing. In the exemplary embodiment described the component carriers 4 are described as pneumatically displaceable component carriers; however, the invention is to be understood in such a manner that they may also be displaceable electromechanically or hydraulically. Furthermore, the invention is described with reference to the example of a tank-filling venting device which is to be introduced into the fuel container. However, the invention should be understood in such a manner that the tank-filling venting device represents all conceivable built-in components to be introduced into the fuel container. The tank-filling venting device comprises a tank-filling vent valve 5a as a fuel level limiting valve, a vent line 5b and a connection fitting 5c, which are connected to one another. The tank-filling venting device 5 is shown in highly simplified form for purposes of clarity; in reality the fuel container for motor vehicles has various vent points which are interconnected by vent lines. The vent points are in the form either of fuel level limiting valves with roll-over function or of simple operational vent valves and are connected to one another via one or more trains of conduits.

In the exemplary embodiment shown, each of the components of the tank-filling venting device 5 is displaceable or movable in the spatial axes by means of pneumatic cylinders and corresponding receptacles (not shown in detail).

FIG. 1 shows the production of the fuel container with the tool open. The outer moulds 3a, 3b define the mould nest determining the contour of the container.

In a first process step the outer moulds 3a, 3b are moved or closed in the direction of the x-axis against the central mould 3c. The still warm-plastic extrudate, or the still warm-plastic preforms 1, are expanded, shaped and applied to the mould walls through exertion of differential pressure inside the mould nest defined by the outer moulds 3a, 3b, or inside the cavity formed by the outer moulds 3a, 3b, as is shown, for example, in FIG. 2. In this way two shell-shaped intermediate products 6 are obtained.

The tank-filling venting device 5 is then placed against an inner wall 7a of an intermediate product 6a by means of the component carrier 4. As this happens the tank-filling vent valve 5a is first pressed against the still warm-plastic inner wall 7a. The tank-filling vent valve 5a is provided on its periphery with fastening feet (not shown) which are each provided with openings. As the tank-filling vent valve 5a is pressed against the still warm-plastic inner wall 7a of the intermediate product 6a, the thermoplastic extrudate flows through and behind the openings of the fastening feet of the tank-filling vent valve 5a, so that a form-fitting joint, and optionally also a material joint, is produced between the tank-filling vent valve 5a and the inner wall 7a. By contrast, the connection fitting 5c located remote from the tank-filling vent valve 5a is moved in the direction of the z-axis so that it pierces or penetrates the wall of the intermediate product 6a. For this purpose the connection fitting 5c is provided with a penetration tip 8. A receptacle 9 for the connection fitting 5c is provided at a corresponding location in the outer mould 3a. The connection fitting 5c is further equipped with a peripheral collar 10 which is welded to the inner wall 7a of the intermediate product 6a.

In a further process step the outer moulds 3a, 3b are moved or opened in the x-axis, the central mould 3c is moved out in the direction of the z-axis from between the outer moulds 3a, 3b; the outer moulds 3a, 3b then close, the intermediate products 6a, 6b being welded together by their peripheral edges 11 to form a closed fuel container.

In what follows reference is first made to FIGS. 4 to 8, which illustrate the production of a fuel container according to a first exemplary embodiment of the invention.

As can be seen in particular in FIG. 4, it is provided in the first exemplary embodiment of the fuel container according to the invention that the vent line 5b is in the form of a corrugated tube which, through its construction, has somewhat lower stiffness than a vent line usually installed and offers a certain variability of length. In FIG. 4 the vent line 5b, which extends between the connection fitting 5c and the tank-filling vent valve 5a, is shown with a meandering curved configuration. It should be emphasised at this point that the meandering path of the vent line 5b is shown in exaggerated form for reasons of clarity. The vent line 5b may also be completely extended in the position shown, the corrugations of the vent line permitting a length-variability thereof at least to the extent of the necessary degree of freedom of assembly in the direction of the z-axis. The length-variability corresponds approximately to the penetration movement through the inner wall 7a of the intermediate product 6a to be performed by the connection fitting 5c.

In order to counteract the formation of a siphon through the effect of gravity in the vent line 5b as a result of the lower inherent stiffness thereof caused by its construction, the placing of at least one retaining spring 12 on the inner wall 7a is additionally provided. The retaining spring 12 is welded to the inner wall 7a via a pedestal plate 13. The retaining spring 12 comprises an arcuate section 14 adapted to the circular external contour of the vent lines 5b and a guide tongue 15 attached thereto, which serves to guide the vent line 5b to its final retained position, as is shown in FIGS. 6 to 8.

As can be seen from FIGS. 4 to 8 when viewed together, a movement of the penetration tip in the direction of the z-axis causes an extension movement of the vent line 5b such that any curved section present performs a movement in the direction of the x-axis. The vent line 5b is placed under tension and slides, while being guided by the guide tongue 15, into the arcuate section of the retaining spring 12, into which it locks. In this way the vent line 5b is held against the direction of gravity in the installed position of the fuel container and siphon-formation is reliably prevented. The final position of the vent line 5b can be seen in FIG. 5.

In what follows reference is made to FIGS. 9 and 10, in which the production of an alternative variant of the fuel container according to the invention is illustrated.

It should be noted at this point that identical components are provided with the same reference numerals in all the figures.

In the case of the exemplary embodiment represented in FIGS. 9 and 10, the vent line 5b consists of two telescopic tube sections 16a, 16b guided one inside the other. The external diameter of the tube section 16a is slightly smaller than the internal diameter of the tube section 16b. At its end oriented towards the tube section 16b the tube section 16a is provided with a peripheral collar 17 which, in the deployed state, rests against a shoulder 18 of the tube section 16a, between an O-ring seal 19.

Only one possible variant of the telescopic vent line 5b is shown in FIGS. 9 and 10. Alternatively, the deployable tube section 16b which receives the connection fitting 5c may be configured with a smaller diameter than the tube section 16a.

The invention should be understood in such a manner that any desired intermediate section of the vent line 5b may be configured telescopically, or flexibly as a corrugated tube, whereas the whole ventilation line is represented in this way in each case in the drawings. Alternatively, the vent line may be composed of sections of differing elasticity (hard-soft-hard).

LIST OF REFERENCES

1 Preform
2 Tools
3a, 3b Outer moulds
3c Central mould
4 Component carrier
5 Tank-filling venting device
5a Tank-filling vent valve
5b Vent line
5c Connection fitting
6a, 6b Intermediate products
7a Inner wall
8 Penetration tip
9 Receptacle
10 Collar 11 Peripheral edge
12 Retaining spring
13 Pedestal plate
14 Arcuate section of retaining spring
15 Guide tongue of retaining spring
16a, 16b Tube sections
17 Collar
18 Shoulder
19 O-ring seal

The invention claimed is:

1. A method for producing a fuel container for motor vehicles from thermoplastic material, comprising:
   providing a plurality of web-type preforms, and shaping the preforms in a first heat in a multi-part moulding tool to form a plurality of shell-shaped intermediate products in a first step, and
   forming a one-piece, closed container in the multi-part moulding tool in a second step,
   fastening at least one tank-filling and/or operational venting device to at least one inner wall of at least one of the intermediate products between the first and second steps in such a manner that at least one preassembled part of the tank-filling and/or operational venting device having at least one connection fitting, at least one vent line and at least one functional component is fastened to the inner wall by a material and/or form-fitting joint in one work cycle,
   penetrating the wall of the intermediate product with the connection fitting during the fastening of the at least one tank-filling and/or operational venting device to at least one inner wall of at least one of the intermediate products, with a use of at least one conduit section having a variable length as a part of the vent line.

2. The method according to claim 1, characterised in that an amount of length-variability of the vent line is selected such that the amount corresponds approximately to a distance travelled by the connection fitting in penetrating the wall of the intermediate product.

* * * * *